United States Patent

[11] 3,549,029

| [72] | Inventor | Richard W. Rutter<br>Rte. 1, Box 95-A, Hibbing, Mich. 55746 |
|---|---|---|
| [21] | Appl. No. | 779,133 |
| [22] | Filed | Nov. 26, 1968 |
| [45] | Patented | Dec. 22, 1970 |

[54] BUNK FOR ARTICULATED LOG SKIDDER
6 Claims, 2 Drawing Figs.

[52] U.S. Cl. .................................... 214/77,
280/179, 280/404, 280/402
[51] Int. Cl. ...................................... B60p 1/48
[50] Field of Search .......................... 214/77, 78,
80, (Log Handling Digest), 85.5, 523, 147;
280/404, 143, 145, 179

[56] References Cited
UNITED STATES PATENTS

| 1,909,689 | 5/1933 | Kuchar | 214/523 |
| 2,546,511 | 3/1951 | Jorgensen et al. | 280/145 |
| 2,754,769 | 7/1956 | Yorston et al. | 280/145X |
| 2,876,816 | 3/1959 | Busch et al. | 214/77X |
| 2,956,834 | 10/1960 | Embree | 294/88 |
| 3,008,731 | 11/1961 | Bombardier | 280/179 |
| 3,289,865 | 12/1966 | Hamilton et al. | 214/85 |
| 3,401,955 | 9/1968 | Alton | 280/404 |
| 3,445,014 | 5/1969 | Kullerback | 214/77 |
| 3,452,887 | 7/1969 | Larson et al. | 214/80 |
| 3,472,527 | 10/1969 | Keinonen | 280/404 |

FOREIGN PATENTS

| 659,445 | 3/1963 | Canada | 214/77 |
| 167,105 | 5/1969 | Sweden | 214/85.5 |

Primary Examiner—Robert G. Sheridan
Assistant Examiner—Robert J. Spar
Attorney—Schroeder, Siegfried & Ryan ABSTRACT: A bunk for an articulated log skidder in which the bunk includes a plurality of securing arms independently operated from one another and from the bunk for the purpose of securing the logs therein. The bunk is articulated and pivotally mounted about two axes of movement for ease in loading and dragging logs.

PATENTED DEC 22 1970

3,549,029

INVENTOR.
RICHARD W. RUTTER

BY Schroeder, Siegfried
& Ryan
ATTORNEYS

BUNK FOR ARTICULATED LOG SKIDDER

This invention relates to improvements in log-hauling machines or devices which are used in the harvesting of trees for the purpose of moving logs from a site of cutting to a site of harvesting, such as debranching, slashing and the like. More particularly, the invention is directed to an improvement in log skidding apparatus and with respect to the bunk or tree-holding bed portion of such apparatus.

In the harvesting of trees, a variety of machinery is presently employed for handling of the trees, trunks or logs from the time the tree is cut from its stump until it is debranched and severed into a desired log or lengths preparatory to movement or shipping of such logs to a destination of usage. Skidders are commonly used for moving tree length logs from the site of cutting out of the woods to an area of further harvesting operation. Such skidders will clamp or hold one end of a log or a plurality of logs to permit dragging of the opposite extremity during the transportation of the same. In certain instances, the skidders employ merely a grapple or load-gripping and holding structure. In other instances, one end of a log or a plurality of logs will be placed on a bed portion of the skidder and clamped thereon through cables or other securing means during the skidding operation.

In the present invention, an improved bunk or bed of this type is provided which will handle, that is secure and hold, any number of logs on the skidder and permit additional logs to be added or removed without requiring complete disassembly of the securing portion of the bed. In my improved bunk for a log skidder, a U-shaped holding frame is provided which is mounted for two degrees of movement to provide ease in towing of logs with the bunk having arm extremities for securing logs thereon which are separately articulated and may be moved into a plurality of positions to clamp any number of logs in the holding bunk or bed. The articulated arms are pivotally connected to an upstanding portion or portions of the bunk and are moved through separate actuators so that they may be separately actuated to fit around and secure any number of logs within the bunk for dragging or skidding purposes. This will permit the operator of the skidder to load the bunk through a suitable grapple bucket or tongs, normally associated or mounted on a boom of the skidder to add the end of a log to a pile of logs on the bunk and to secure the same thereon without disturbing or altering that portion of the load in the bunk. This improved bunk permits handling of a variety of load shapes, that is a number of logs, without requiring exact positioning of the same with a positive grip on the load for skidding purposes.

It is, therefore, the principal object of this invention to provide an improved bunk for an articulated log skidder.

Another object of this invention is to provide in a bunk an articulated arm holding portion which will permit holding of a variety of load shapes.

A further object of this invention is to provide an improved bunk for a log skidder which will permit ease in operation and greater load capacity with positive gripping of the logs therein.

A still further object of this invention is to provide an improved bunk for a log skidder which will tilt and pivot to facilitate skidding of logs.

These and other objects of this invention will become apparent from a reading of the attached description together with the drawings, wherein.

Figure 1:
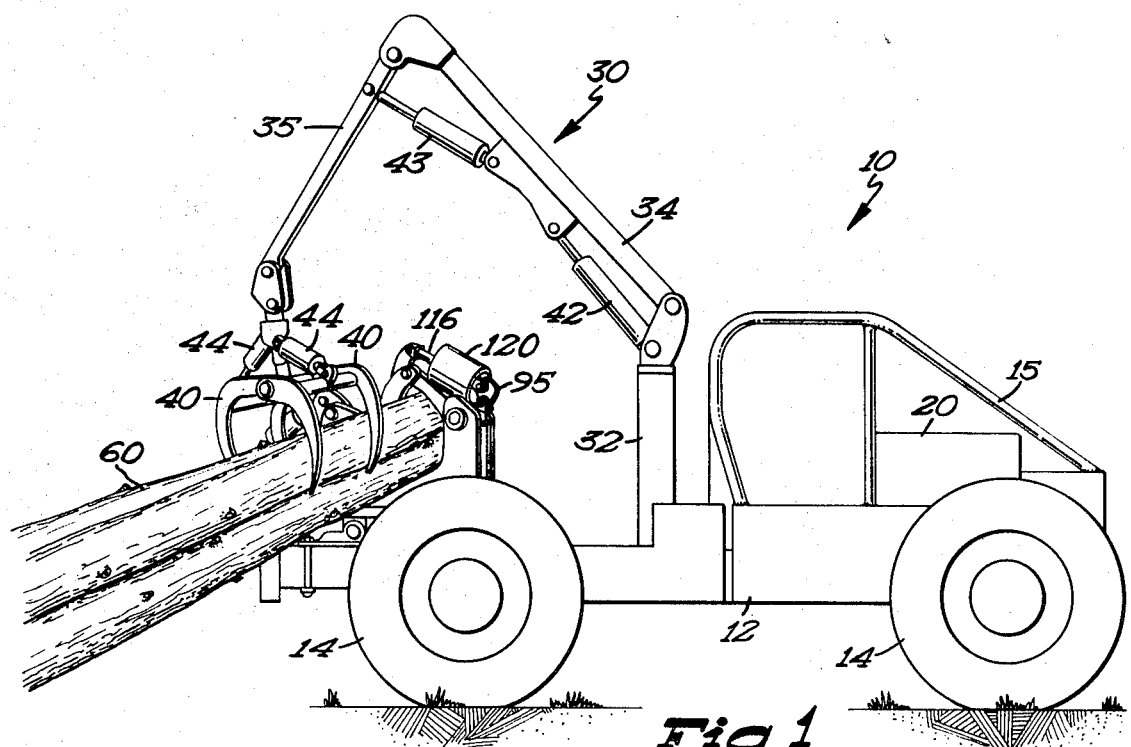
FIG. 1 is an elevation view of a log skidder employing the improved bunk.

My improved bunk for an articulated log skidder is shown in FIG. 1 in elevation in a condition of operation for clamping the ends of a plurality of logs to the skidder for skidding or dragging purposes. In FIG. 1, the skidder is shown generally at 10 as a truck-type vehicle having a chassis or frame 12 with conventional support and drive wheels 14 forming a conventional chassis of the truck type. Such vehicles normally have a minimum of body enclosure, and a suitable frame 15 mounted thereon with an engine, indicated generally at 20 in block, schematically discloses the structure. The skidder itself may take a variety of forms and will normally incorporate an articulated boom, such as is indicated at 30, positioned on the chassis through a suitable support column, indicated at 32, with the boom comprising at least two elements 34, 35 pivotally mounted on the support column and to one another for varying degrees of movement. The end of the boom mounts a grapple or pivoted claw member 40 and suitable actuators 42, 43 and 44 associated with the elements of the boom and grapple position the same such that the boom may be used for picking up tree length logs from the ground and elevating it to the end of the skidder. Although not shown in the drawings, the boom would have a suitable control panel associated therewith with levers thereon for operating appropriate valving to control fluid flow to the respective actuators, generally of the hydraulic type, for the purpose of controlling movement of the boom elements. The details of the skidder with the boom thereon are conventional and may vary in form, hence they are shown herein schematically for simplicity.

Figure 2:
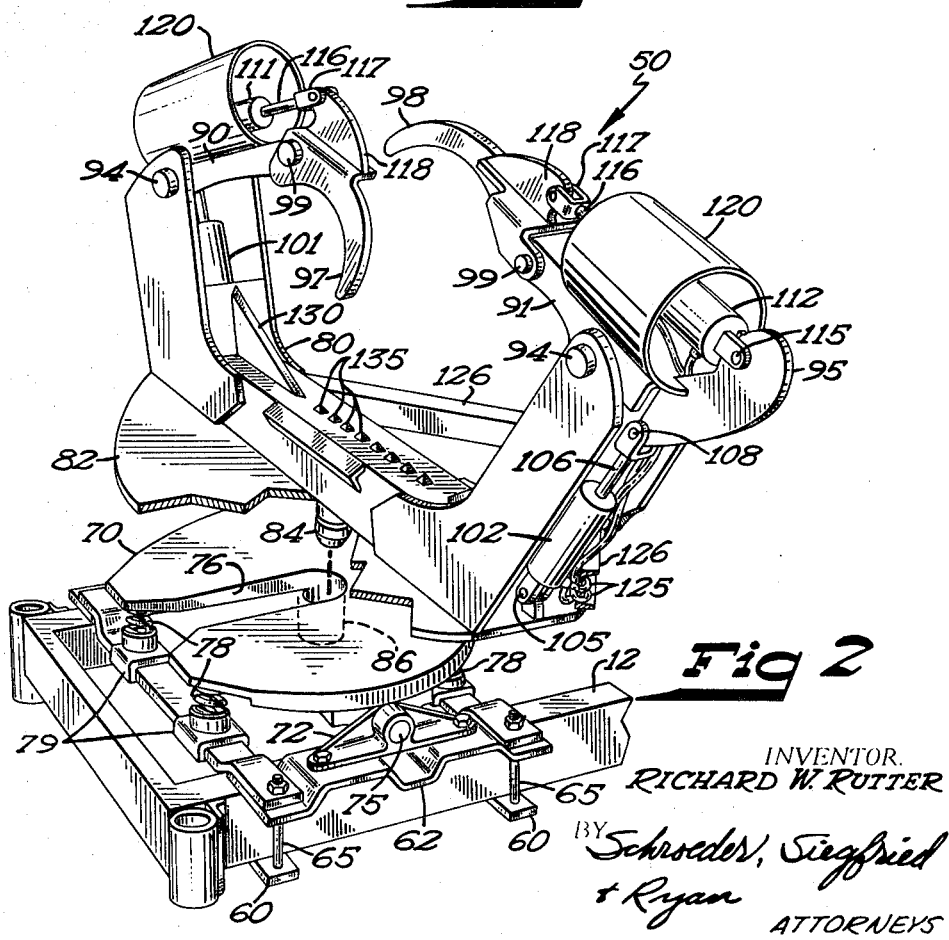
FIG. 2 is a perspective view of the improved bunk for a log skidder.

The bunk or bed for supporting the ends of the logs on the skidder is positioned at or near the rear end of the chassis 12 of the skidder. Thus, as will be seen in FIG. 1, the bunk, which is indicated generally at 50, is mounted on the chassis frame near the rear end thereof such that the boom with a grapple may pick up logs on the ground and move one end of the same onto the bed or bunk to be secured thereon for skidding purposes. In FIG. 1, logs are indicated schematically at 60 in an operative condition of the skidder. In FIG. 2, a portion of the chassis 12 is shown with the bunk in perspective and exploded to indicate the relationship of parts. The improved bunk is mounted on the end of the chassis through a suitable connecting frame formed by transversely extending beam members 60 and cross members 62 which are secured together around the frame through suitable nut and bolt means, indicated generally at 65. The mounting frame positions and mounts a first pivot plate 70 which is pivotally mounted on the connecting frame through flange members 72 having sleeve type bearings which mount shafts 75 connected to the bottom of the pivot plate 70 at diametrically opposed points. In the construction shown in the drawings, this portion of the structure is a conventional fifth wheel from a tractor trailer unit with a slot 76 therein through which a tie pin would slide. The plate is biased to a generally horizontal position with respect to the frame 12 through suitable spring members 78 mounted in supporting spring flanges 79 positioned on the connecting frame. Spring members of this type are positioned on either side of the pivot axis formed by the shafts 75 and sleeve type bearings flange members 72 which align the pivot axis of the plate 70 generally transverse to the extent of the skidder. Limited pivotal movement of the plate 70 is provided to allow the bunk or bed to tilt with respect to the extent of the chassis 12 with loading thereon. The main or frame portion 80 of the bunk or bed is generally U-shaped in construction and formed of a suitable angle iron and upstanding plates to define a general outline of the same. Attached to the base of the same is a second pivot plate 82 having the conventional connecting post 84 connected thereto or extending from the frame itself through the plate and adapted to fit into the retaining socket, indicated at 86 in the plate 70, as is conventional with a fifth wheel construction. Mounted on the upper ends of the frame 80, or the bifurcated portions thereof, are a first pair of arms, indicated at 90, 91, which are connected to the upper extremities of the frame 80 between the plates forming the same through suitable pivot members, indicated at 94. The arms 90, 91, which are concave along their extent, are identical in construction and each have a rearwardly extending flange section 95 at the end of the same through which actuators are connected, as will be later described. The arms 90, 91 mount respectively a second set of claw arms 97, 98 which are attached to the free extremity of the arms 90, 91 through suitable pivot pins, indicated at 99. The arms 97, 98 are curved or concave along their inner gripping surface similar to arms 90, 91 such that they will fit around or contact to contours of logs to aid in securing logs in the bed or bunk. The arms 90, 91 and 97, 98 are adapted to be independently operated with respect to one another and the frame 80 and a first set of actuators, indicated at 101, 102 of the pneumatic or hydraulic-type pivot the arms 90, 91 with respect to the upstanding frame parts. Thus, as will be seen in the drawing, the cylinder portions of the actuators 101, 102 are connected to the frame 80 through suitable pivoting linkages, indicated generally at 105, with the shaft extremities of the actuators, indicated at 106, connected to the flanges 95 of the arms 90, 91 through bifurcated pivot connections, indicated at 108. Thus, operation of the actuators 101 or 102 selectively will move one or the other of the arms 90, 91 with respect to the frame for the purpose of holding or gripping logs in the bed. Similar actuators of the pneumatic or hydraulic type and indicated respectively at 111, 112 are positioned between the flange sections 95 of the arms 90, 91 and the arms 97, 98 for the purpose of deflecting the arms 97, 98 with respect to the arms 90, 91 on which they are mounted. Thus, as shown in the drawings, the cylinder part of the actuators 111, 112 are connected to the flange sections 95 of the arms 90, 91 through pivot connections, indicated generally at 115, with the shaft extremities, indicated at 116, being connected to ridge type connecting flanges 118 on the respective arms 97, 98 through pivot coupling 117 such that the arms 97, 98 may be actuated or articulated with respect to their supporting structures through operation of these actuators. As will be seen in the drawings, the plates forming the upstanding or bifurcated portions of the frame 80 define a mounting structure for the actuators 101, 102 and shield the same. Similarly, protective cylindrical members 120 are suitably connected to the arms 90, 91 and encircle the actuators 111, 112 for the purpose of protecting the same. Suitable fluid connections, indicated generally at 125, extend to opposite ends of the respective operating cylinders of all of the actuators for the purpose of selectively supplying or withdrawing hydraulic fluid or air to the respective ends of the cylinders for the purpose of reversible linear actuation of the shafts. The fluid lines 125 are directed down through and between the plates forming the upstanding portion of the frame 80 and through a suitable angle iron frame part 126 attached to the plate 82 mounting the bunk being within the channel construction for protection of the fluid lines from abrasion or bumping by the logs held on the bunk. This frame is generally triangular in shape and the fluid lines are tied together at this point with suitable slack leading to the ultimate and control panel on the skidder (not shown) to permit movement of the bunk about its pivot axes under operating conditions.

In addition to the articulation of the arms of the bunk for the purpose of holding logs thereon, the frame itself includes knife edge plates 130 at the corners thereof and toothed or studded grip members 135 across the bottom of the frame which will serve to bite into the surface of logs placed on the bed or bunk to prevent the same from sliding.

The improved bunk for an articulated log skidder permits the operator of the skidder to load logs on the bunk from the control position on the boom through operation of the grapple to pick up individual logs and set them on the bunk. The control panel for the boom also includes suitable controls (not shown) for operating independently and selectively the actuators for the arms of the bunk so that the bunk may be opened for loading purposes. Since the individual logs are not normally picked up at the same location, the loading operation for the skidder will take place by moving the skidder to various sites where the trees have been felled and the tree length logs loaded one at a time. The improved bunk permits the operator to perform the loading operating from his position at the boom and through suitable controls with the individual logs being securely clamped in the bunk by articulation of the arms to desired clamping positions. This provides an advantage over prior bunk or bed constructions in which the bed or bunk is comprised only of a U-shaped frame with a suitable securing chain across the top of the same and with the frame being permitted only the vertical axis of movement for towing purposes. Where power actuators were used on prior bunks, they merely served to tighten the cable or chain-securing logs in the bed or bunk. It was necessary for the operator to dismount from the vehicle and release the cable or chain to permit entrance of logs therein and required subsequent connection of such structures.

With the improved bunk, the skidder operator may move from site to site picking up individual logs and securing the same in the bunk until a desired load is obtained after which the skidder will move the logs to a point of destination for further harvesting or loading. The arms through their respective power actuators will exert sufficient force on the ends of the logs positioned on the bunk so as to retain them therein during skidding operation and any number of logs may be located in the bunk since the arms will permit pivoting with respect to the frame to secure any number of logs therein. The knife edge surface of the corners of the frame, as indicated at 130, and the tooth studded bottom of the frame 135 ensure that the logs will be gripped at this point so that the load will be securely positioned in the bunk to facilitate handling. The bunk, which is mounted for vertical movement on the turntable or supporting plates with the lower plate being pivoted to mount a transverse axis, will allow tilting and turning of the load, such as is indicated in FIG. 1, so that the skidder may drag logs and load logs from any position and so that the load thereon may be moved from a position at an angle to the extent of the chassis to a trailing position during the dragging operation. This trailing increases the mobility of the skidder and permits operation of the skidder by a single operator from a single control position. The improved skidder will handle a variety of load shapes and will provide positive gripping of the logs for skidding purposes. The base of the articulated bunk is formed by the conventional fifth wheel construction of a tractor trailer unit and hence the bunk may be removed from the skidder and the lower or turntable plate may be utilized for connecting of a conventional trailer to the skidder whenever it is desired to use the skidder as a tractor or motive unit for a conventional trailer in hauling.

I claim:

1. A bunk for an articulated log skidder having a wheeled frame and motive means therefor together with an articulated grapple mounted on the frame comprising, a log-holding bunk frame, means pivotally mounting the log-holding bunk frame on one end of the wheeled frame of the skidder to provide two axes of movement of the bunk frame relative to the wheeled frame one of which is transverse to the extent of the wheeled frame and the other vertical with respect to the wheeled frame, said bunk frame being generally U-shaped in form and having pivotally mounted thereon a pair of articulated arms one pivoted on another at each extremity of the bunk frame, and means for selectively moving the articulated arms on the bunk frame relative to one another and relative to the bunk frame, said means including separate actuator means connected respectively to each of the arms of each of said pairs and being operated independent of one another.

2. A bunk for an articulated log skidder having a wheeled frame and motive means therefor together with an articulated grapple mounted on the frame comprising, a log-holding bunk frame, means pivotally mounting the log-holding bunk frame on one end of the wheeled frame of the skidder to provide two axes of movement of the bunk frame relative to the wheeled frame one of which is transverse to the extent of the wheeled frame and the other vertical with respect to the wheeled frame, said bunk frame being generally U-shaped in form and having pivotally mounted thereon a pair of articulated arms one pivoted on another at each extremity of the bunk frame, and means for selectively moving the articulated arms on the bunk frame relative to one another and relative to the bunk frame, said means including separate actuator means connected respectively to each of the arms and being operated independent of one another, and including a toothed peripheral surface on the connecting portion of the U-shaped bunk frame intermediate the upstanding bifurcated extremities.

3. The bunk for an articulated skidder of claim 2 and including spring bias means positioned between the wheeled frame and a portion of the pivotal mounting means to bias the bunk frame to a predetermined position with respect to the transverse pivot axis.

4. A bunk for an articulated skidder of claim 1 in which the pivotal mounting means for the log-holding bunk frame includes a first plate member having journal means secured to one side thereof and mounting a pivotal journal shaft secured to the wheel frame transverse of the extent of the same, and a platelike portion attached to the U-shaped form of the bunk frame with a journaling post extending therefrom and mounting in a sleeve type journal member in the first-named plate member to define the two aces of pivot for the bunk frame on the wheeled frame of the skidder.

5. The bunk for an articulated skidder of claim 2 in which the outermost arm of the separate arms on the bifurcated extremities of the bunk frame have a concave contour such that they will fit around and clamp logs held in the bunk frame.

6. The bunk for an articulated skidder of claim 5 in which the selectively moving means for the arm means on the bifurcated extremities of the bunk frame are fluid linear actuators with cover means shielding the same.